Aug. 26, 1969　　F. S. BLACK ETAL　　3,463,674
THERMOCOUPLE HAVING COMPOSITE SHEATH
Filed Dec. 11, 1967
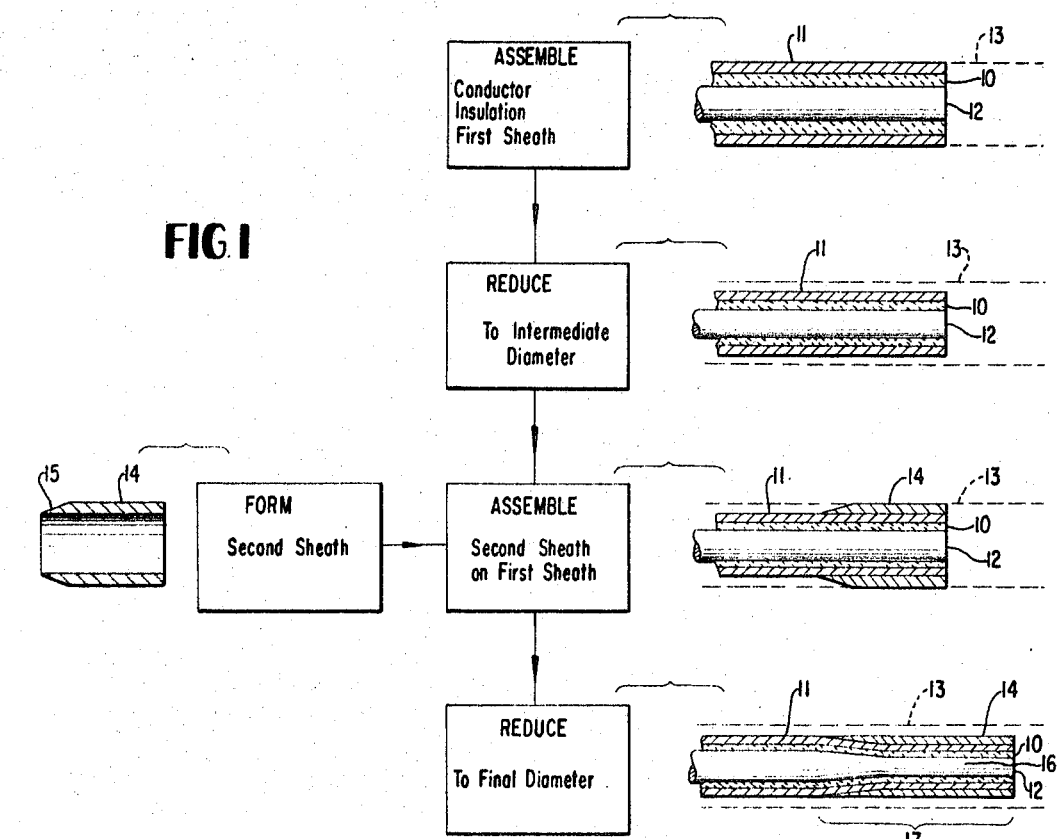
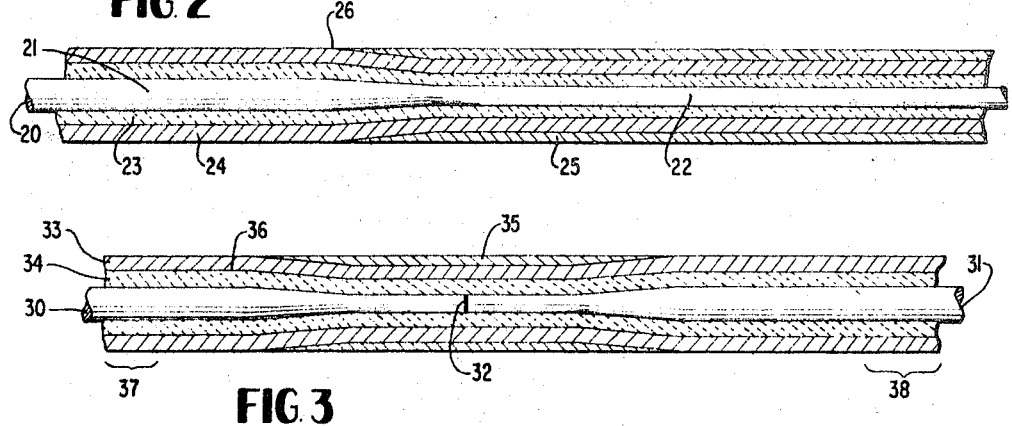
INVENTORS
FRANK S. BLACK
THOMAS P. HASELTON
BY *George A. Herbster*
ATTORNEY United States Patent Office 3,463,674
Patented Aug. 26, 1969

3,463,674
THERMOCOUPLE HAVING COMPOSITE SHEATH
Frank S. Black, Wenham, and Thomas P. Haselton, Lynn, Mass., assignors to General Electric Company, a corporation of New York
Filed Dec. 11, 1967, Ser. No. 689,491
Int. Cl. H01v 1/04
U.S. Cl. 136—233                    4 Claims

ABSTRACT OF THE DISCLOSURE

A sheathed electrical conductor assembly for high temperature, vibrational, oxidizing environments. Compacted insulation and a first sheath of substantially constant radial thicknesses surround the conductor. Mechanically reducing a second sheath onto the first to produce a continuously surfaced, cylindrical assembly causes the conductor to have a reduced portion axially coextensive with an increased thickness, composite wall formed by the first and second sheaths.

BACKGROUND OF THE INVENTION

This invention relates to sheathed electrical conductors and thermocouples and more specifically to sheathed electrical conductors and thermocouples adapted for use in high temperature, vibrational, oxidizing environments.

When it is necessary to transmit electrical signals or to obtain certain measurements in particular environments, conventional insulating techniques are not feasible. One such environment is the highly oxidizing, highly vibrational, high temperature environment associated with jet propulsion engines. In such environments it is often necessary to obtain accurate temperature readings and to transmit these readings to remote locations.

When the prior art approach of sheathing conductors is followed in contemporary jet propulsion engines, certain compromises have been necessitated because four characteristics or properties have usually been in conflict. First, as the life span of such an assembly depends upon its ability to withstand the oxidizing and vibrational properties of the environment, good oxidation and vibration resistance is required to minimize expensive component maintenance and replacement. Sseconldy, the response time of thermocouple junctions in part determines the operating parameters and the maximum safe usable power obtainable from the engine. Response time decreases as the conductor diameter decreases. Furthermore, when two wires are connected, such as a sheathed electrical conductor to a thermocouple lead, it is desirable to have the wires of equal diameters. However, decreasing the wire diameter to obtain an optimum response time or optimum wire diameter match was compromised because the expectant life span of unsupported wire portions in a vibrating environment was adversely affected and subsequent interfacing of the fine wires with other conductors at junction boxes and the like posed serious manufacturing problems. Two additional factors have been weight and cost. Any advance which reduces component weight on an aircraft is important. Furthermore in the environment normally encountered in jet propulsion engines, oxidation resistant sheath materials are expensive. In the prior art use of a single sheath, optimizing one property such as oxidation and vibration resistance on the environment reduced effectiveness in the other three.

Therefore, it is an object of this invention to provide a construction for sheathed thermocouples and electrical conductors which substantially overcomes certain compromises and problems present in the prior art.

It is another object of this invention to provide a construction for sheathed thermocouples and electrical conductors which resist oxidation to provide longer life.

Another object of this invention is to provide a construction for sheathed thermocouples and electrical conductors which, in a highly vibrational environment, is of a minimum weight and has a fast response time.

Still yet another object of this invention is to provide construction for sheathed thermocouples and electrical conductors in which oxidation resistant alloys are utilized effectively.

SUMMARY

In accordance with one aspect of this invention, a conductor or thermocouple has a composite sheath formed about an intermediate insulating material to form a heavy wall portion axially coextensive with a reduced diameter conductor or thermocouple portion.

This invention has been pointed out with particularity in the appended claims. Further objects and advantages of this invention may be had by referring to the following detailed description taken in conjunction with the accompanying drawings.

BRIEF DESCRIPTION OF THE DRAWINGS

FIGURE 1 schematically and pictorially illustrates a process for forming a composite sheath for an electrical conductor or a thermocouple in accordance with this invention;

FIGURE 2 is an enlarged detailed cross section of a sheathed electrical conductor formed in accordance with this invention; and FIGURE 3 is an enlarged detailed cross section of a continuously sheathed thermocouple formed in accordance with this invention.

DESCRIPTION OF ILLUSTRATIVE EMBODIMENTS

In accordance with this invention as outlined in FIGURE 1, a sheathed electrical conductor is formed by inserting insulation 10 between a first sheath 11 and a conductor 12. The conductor 12 may be formed of any material which can be coldworked, such as copper, iron or nickel. Insulation 10 is normally formed as either beads or powder composed of magnesium oxide, aluminum oxide, or beryllium oxide while the sheath 11 may be formed of any material which resists vibration at high temperature; for example, stainless steel alloys or wrought heat-resisting nickel-base alloys such as Inconel made by International Nickel Company. When the sheathed conductor insulation is formed with beads, the beads are placed on a conductor 12 which is then inserted into the sheath 11. When powder is used, the conductor 12 is centered in the sheath 11 and the powder is added.

After this assembly has been formed, its diameter is reduced by some process such as cold-working by swaging, rolling or drawing to compact the insulation 10. The resultant diameter reduction of the sheathed electrical conductor is shown by comparison with its original diameter indicated by the dashed lines 13.

To form the composite sheath, a second sheath, of a material which resists oxidation at the operating temperatures encountered in the conductor environment is applied. One such material, which also has good vibrational strength and may be used for the first sheath, is a wrought heat-resisting nickel-base alloy having the following composition.

| Element: | Range of percentages by weight |
|---|---|
| Chromium | 20.50–23.00 |
| Iron | 17.00–20.00 |
| Molybdenum | 8.00–10.00 |
| Cobalt | 0.50– 2.50 |
| Tungsten | 0.20– 1.00 |
| Silicon | maximum__ 1.00 |
| Manganese | do____ 1.00 |
| Carbon | 0.05– 0.15 |
| Nickel | Balance |

Such an alloy is commercially available from Union Carbide Corporation under the trade name of Hastelloy X.

This second sheath is formed as a cylindrical member 14 which is tapered or feathered at one end 15. The particular taper angle is chosen so that a smooth surface transition occurs. Once the second sheath 14 has been formed, it is disposed on the conductor assembly. The axial length of the second sheath 14 depends upon the desired axial length of the reduced diameter conductor portion and the length of the assembly to be exposed to the environment.

After the second sheath 14 is properly located on the sheathed electrical conductor, the composite assembly diameter is reduced, again by conventional techniques such as rolling, swaging or drawing, to produce an assembly which has a uniform diameter and a smooth, continuous outer surface. In this final form, the conductor 12 has a reduced portion 16, but the first sheath 11 and the second sheath 14 form a double thickness wall portion 17 coextensive with the reduced portion 16 of the conductor.

Referring now to FIGURE 2, a sheathed electrical conductor formed in accordance with this invention comprises a center conductor, generally designated by numeral 20, including an original diameter portion 21 and a reduced diameter portion 22. Coextensive with the entire length of the conductor 20 is an insulating layer 23 and a first sheath 24, the insulation and sheath having substantially constant radial thickness.

Hence, that portion of the sheathed electrical conductor coextensive with the conductor portion 21 has a relatively thin wall so it is of optimum diameter for mating to other equipment and resisting conductor breakage. Also as this portion of the sheathed electrical conductor is not exposed to extreme oxidation, the thin wall minimizes the quantity of oxidation or strength material which is necessary. However, at the other end of the sheathed electrical conductor where oxidation resistance and assembly strength are important requirements and where a small diameter wire may be required, the second sheath 25 combines with the first sheath 24 to produce an added wall thickness to thereby increase both oxidation resistance and strength while providing an optimum wire diameter. At the point designated by 26 there is a smooth material transition between the first and second sheaths 24 and 25. If a notch were to occur at this point on the surface, there would be a probability of failure.

The system described in FIGURE 1 with respect to a sheathed electrical conductor is equally adapted to continuously sheathed thermocouple as shown in FIGURE 3 comprising two oppositely extending conductors 30 and 31 of dissimilar materials which are joined to form a thermocouple junction 32. Any number of materials can be utilized to form such a junction. Two common dissimilar materials are a heat-resistant, nickel-chromium resistance alloy known as Chromel P and a heat-resistant, nickel-base alloy known as Alumel. Initially the two dissimilar conductors 30 and 31 have equal diameters. A first sheath 33 and an intermediate insulating material 34 are disposed about the thermocouple junction, and the overall diameter is mechanically reduced.

To facilitate complete understanding, the following discussion is directed to a specific example; it should not be construed as representing any limitation on incorporating this invention in sheathed electrical conductors or thermocouples. For purposes of this example, the thermocouple is initially swaged to an outer diameter of 0.068″. The second sheath, 35, is then applied as a preformed tube having a thickness of about 0.010″ and an inner diameter of about 0.072″. An overall tube length of 4 inches includes two end portions tapered at about 85° to provide an axial taper length of approximately 1 inch at each end. This preform, formed of an oxidation resistant material, is then applied over the first sheath 33.

Once the second sheath 35 is disposed over the first sheath 33, the entire assembly is again swaged either in a single or multiple operation to a final diameter, for example, to about 0.060″. During this swaging operation, the second sheath 35 is compressed and reduces the diameter of the conductors 30 and 31 adjacent the thermocouple junction 32. The reduced conductor portions are axially coextensive with the second sheath 35, and the outer sheath surface is continuous. No notch or other discontinuity appears at the point 36 if the second sheath 35 is properly tapered.

After the assembly is reduced to its final diameter, it may be either used in a straight form or annealed and then formed into any desired configuration. Normally the assembly is annealed and then bent into a U shape so the thermocouple junction 32 is supported by the end portions 37 and 38 in thermocouple supporting fixtures, which are not shown, but are well known.

With this continuously sheathed thermocouple configuration the composite heavy wall portion of the sheath adjacent the thermocouple junction 32 provides added oxidation resistance and strength. Because the wire diameter of the conductors 30 and 31 is reduced adjacent the thermocouple junction 32, improved response times results so more reliable and accurate readings are obtained. As the heavy wire portion of the conductors 30 and 31 are disposed at the supporting portions 37 and 38, greater conductor strength and manufacturing advantages are obtained while eliminating the double sheath structure. The heavy wall-thin wire cross section at the thermocouple junction and heavy wire-thin wall cross-section at the supports also minimizes weight and effectively uses materials.

Hence, a thermocouple or sheathed electrical conductor formed in accordance with this invention has a longer life expectancy, because its resistance to oxidation and vibration is increased while better manufacturing characteristics or response times are obtained. However, these advantages are realized without sacrificing weight or cost advantages.

As will be obvious to those of ordinary skill in the art, many modifications may be made to this invention. For example, different materials may be utilized for the sheaths, the insulation or the conductors. Different processes may be incorporated for producing the final configurations, or different conductor or thermocouple assembly configurations, such as multiwire configurations, could be evolved. It is the object of the appended claims to include all such modifications and variations which come within the true spirit and scope of this invention.

What is claimed as new and desired to be secured by Letters Patent of the United States is:

1. A thermocouple assembly comprising:
(a) a thermocouple junction formed by two contiguous reduced portions of dissimilar wires capable of being mechanically reduced;

(b) compacted mineral insulating materials surrounding said thermocouple wires;

(c) a first sheath about said insulating material including a reduced diameter portion axially coextensive with said reduced diameter wire portions;

(d) said insulating material and said first sheath having substantially constant radial thicknesses along the length of said thermocouple assembly; and (e) a second sheath located over and integral with said reduced diameter portion of said first sheath to form a constant outer diameter thermocouple assembly along its entire length and having a continuous outer sheath surface.

2. A thermocouple assembly as recited in claim 1 wherein said assembly is exposed to a vibrational, oxidizing, high temperature environment, said first sheath being formed of a material for providing structural strength and said second sheath being formed of an oxidation resistant material.

3. A thermocouple assembly as recited in claim 2, one of said dissimilar metals being formed of a heat resistant, nickel-chromium resistance alloy and the other of said dissimilar metals being formed of a heat-resistant, nickel-base alloy, said compacted mineral insulating material being composed of a compound taken from a group consisting of magnesium oxide, aluminum oxide and beryllium oxide, said first sheath being taken from a group of alloys consisting of stainless steel and wrought heat-resisting nickel-base alloys and said second sheath being formed of a chrominm-nickel-iron-molybdenum wrought, heat-resisting alloy.

4. A thermocouple assembly as recited in claim 3 wherein said first and second sheath materials are formed of an alloy consisting of 20.50–23.00% chromium, 17.00–20.00% iron, 8.00–10.00% molybdenum, 0.50–2.05% cobalt, 0.20–1.00% tungsten, less than 1.0% silicon, less than 1.0% manganese, 0.05–0.15% carbon, and the balance of nickel.

References Cited

UNITED STATES PATENTS

| | | | |
|---|---|---|---|
| 2,805,272 | 9/1957 | Postal | 136—200 X |
| 2,852,596 | 9/1958 | Prince | 174—127 X |
| 3,065,286 | 11/1962 | Connell | 136—233 |
| 3,121,038 | 2/1964 | Perotte | 136—201 X |
| 3,281,921 | 11/1966 | Danko et al. | 136—201 X |
| 3,283,397 | 11/1966 | Beckman | 29—573 |
| 3,285,786 | 11/1966 | Katz | 136—201 X |
| 3,329,534 | 7/1967 | Adler et al. | 136—233 |

FOREIGN PATENTS

| | | |
|---|---|---|
| 854,570 | 11/1960 | Great Britain. |
| 994,235 | 6/1965 | Great Britain. |
| 1,334,264 | 6/1963 | France. |

WINSTON A. DOUGLAS, Primary Examiner

A. BEKELMAN, Assistant Examiner

U.S. Cl. X.R.

29—573; 136—201; 174—106